United States Patent
Isai

[11] Patent Number: 5,960,914
[45] Date of Patent: Oct. 5, 1999

[54] MECHANICAL DISC BRAKE

[75] Inventor: Tun-Hsien Isai, Taipei, Taiwan

[73] Assignee: Goshen Industries Inc., Taipei, Taiwan

[21] Appl. No.: 09/240,687

[22] Filed: Feb. 2, 1999

[51] Int. Cl.$^6$ ........................................ F16D 55/08
[52] U.S. Cl. .................... 188/72.8; 188/26; 188/196
[58] Field of Search ..................... 188/26, 72.1, 72.3, 188/72.8, 72.9, 196 M, 196 BA, 196

[56] References Cited

U.S. PATENT DOCUMENTS

| | | | |
|---|---|---|---|
| 3,927,736 | 12/1975 | Bergles | 188/26 |
| 4,050,549 | 9/1977 | Hori et al. | 188/72.8 |
| 4,162,720 | 7/1979 | Haraikawa | 188/71.9 |
| 4,319,669 | 3/1982 | Watanabe | 188/72.8 |
| 4,633,978 | 1/1987 | Hoff | 188/71.7 |

*Primary Examiner*—Chris Schwartz
*Attorney, Agent, or Firm*—Bacon & Thomas

[57] ABSTRACT

A mechanical disc brake including an inner caliper, an outer caliper and a brake lever is disclosed. The inner and outer calipers are associated with each other by bolts and fixed on a bicycle by a U-shaped bracket. The inner caliper is formed with circular hole and two lateral faces of the circular hole are expanded to form circular dents. One of the circular dents is formed with recessed spiral threads and a transmission piston thread rod formed with projecting spiral threads is fitted in the circular dent. The transmission piston thread rod is sequentially connected with an adjustment thread rod and a lining assembly. The outer caliper is correspondingly disposed with a lining assembly. A restoring spring is disposed in the other of the circular dents and connected with a brake lever. When the brake lever is pulled, the transmission piston thread rod, adjustment thread rod and lining assemblies are pushed forward, whereby the lining assemblies cooperatively tightly clamp the brake disc. When the brake lever is released, the transmission piston thread rod, adjustment thread rod and lining assemblies are synchronously restored to achieve a best gap between the lining assemblies and the brake disc.

3 Claims, 5 Drawing Sheets

MECHANICAL DISC BRAKE

BACKGROUND OF THE INVENTION

The present invention relates to an improved mechanical disc brake in which when the brake is released, the lining assemblies for tightly clamping the brake disc are restored to their home positions and kept spaced from the brake disc by an optimal gap.

In a conventional bicycle-used disc brake, lining assemblies are mounted on opposite inner faces of an inner and an outer sections of a caliper. When braking, a steel cord is pulled to drive a brake lever so as to make the lining assemblies tightly clamp the brake disc. When the brake is released, the brake lever is restored to its home position. At this time, the brake disc is released from the clamping force of the lining assemblies. Accordingly, a rider can decelerate or stop the bicycle. Some shortcomings exist in the above arrangement as follows:

1. In the conventional brake, via an adjustment piston and a thread rod, the lining assemblies are synchronously forward pushed by the brake lever so as to achieve a braking effect. These components are not interconnected so that when releasing the brake, only the brake lever is restored to its home position due to releasing of the pull cord, while the other components such as adjustment piston and lining assemblies will still intermittently or continuously contact with the brake disc depending on the road condition. Therefore, during running, a frictional force is created to waste the strength of the rider.

2. In the conventional brake, during braking, the brake lever serves to drive and push the operation piston, adjustment piston, thread rod, connecting section and lining assembly in the inner caliper, whereby the lining assembly of the inner caliper together with the lining assembly of the outer caliper can clamp the brake disc to achieve a braking effect. However, the above components will not automatically restore. Therefore, after a long period of use, the lining assembly will be worn and have a thinner thickness. Under such circumstance, the gaps on two sides will be different from each other and an optimal braking effect will be hardly achieved. This will lead to safety problems.

SUMMARY OF THE INVENTION

It is therefore a primary object of the present invention to provide an improved mechanical disc brake in which when the brake is released, the lining assemblies of the brake are kept spaced from the brake disc by an optimal gap without affecting the running of the bicycle.

It is a further object of the present invention to provide the above mechanical disc brake which is applicable to all kinds of bicycles.

According to the above objects, the mechanical disc brake of the present invention is installed on a bicycle to clamp or release a brake disc. The brake has a brake lever one end of which is sequentially connected with a transmission piston thread rod, an adjustment thread rod and a lining assembly. The other end thereof is connected with a pull cord passing through a pull cord fixing pin. When pulling the pull cord to drive the brake lever, the transmission piston thread rod, adjustment thread rod and lining assemblies are synchronously shifted, whereby the lining assemblies cooperatively tightly clamp or release the brake disc. When the brake lever is released, the lining assemblies are kept spaced from the brake disc by an optimal gap.

The present invention can be best understood through the following description and accompanying drawings, wherein:

DETAILED DESCRIPTION OF THE PREFERRED EMBODIMENT

Figure 1:
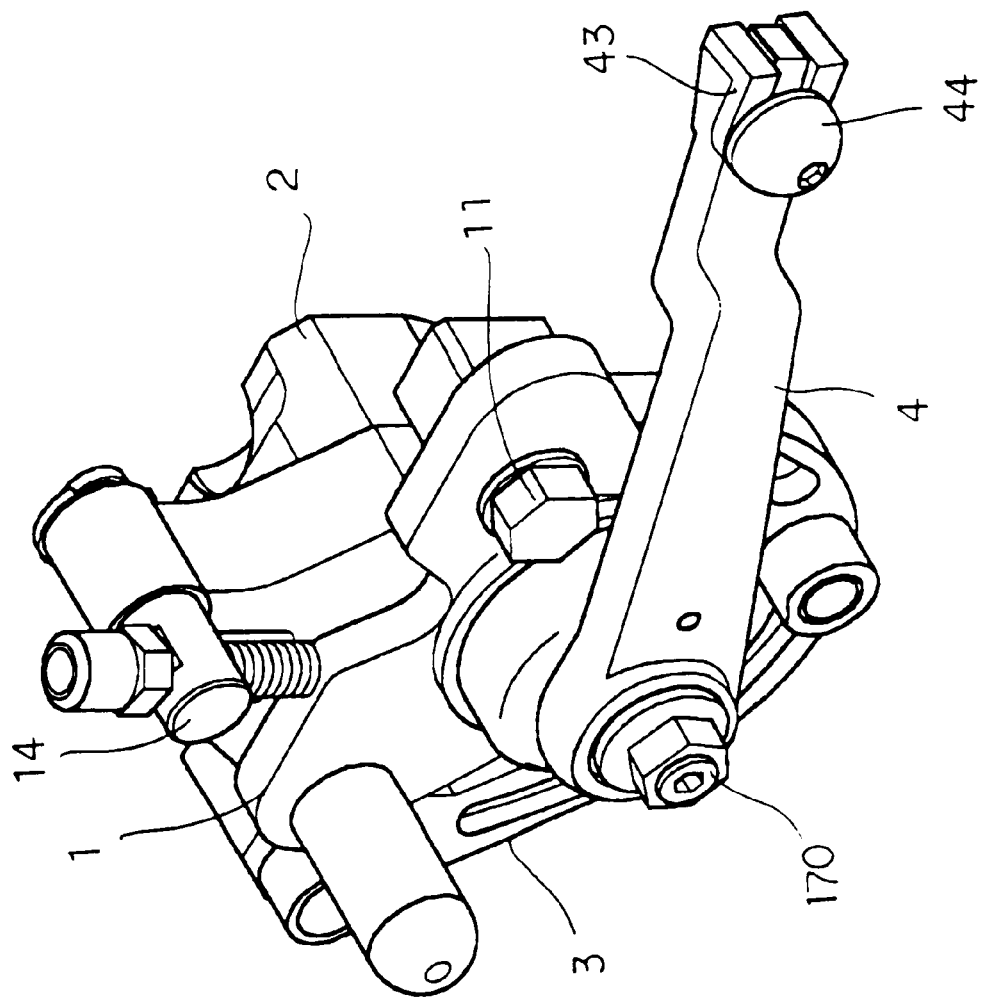
FIG. 1 is a perspective assembled view of the present invention.
Figure 2:
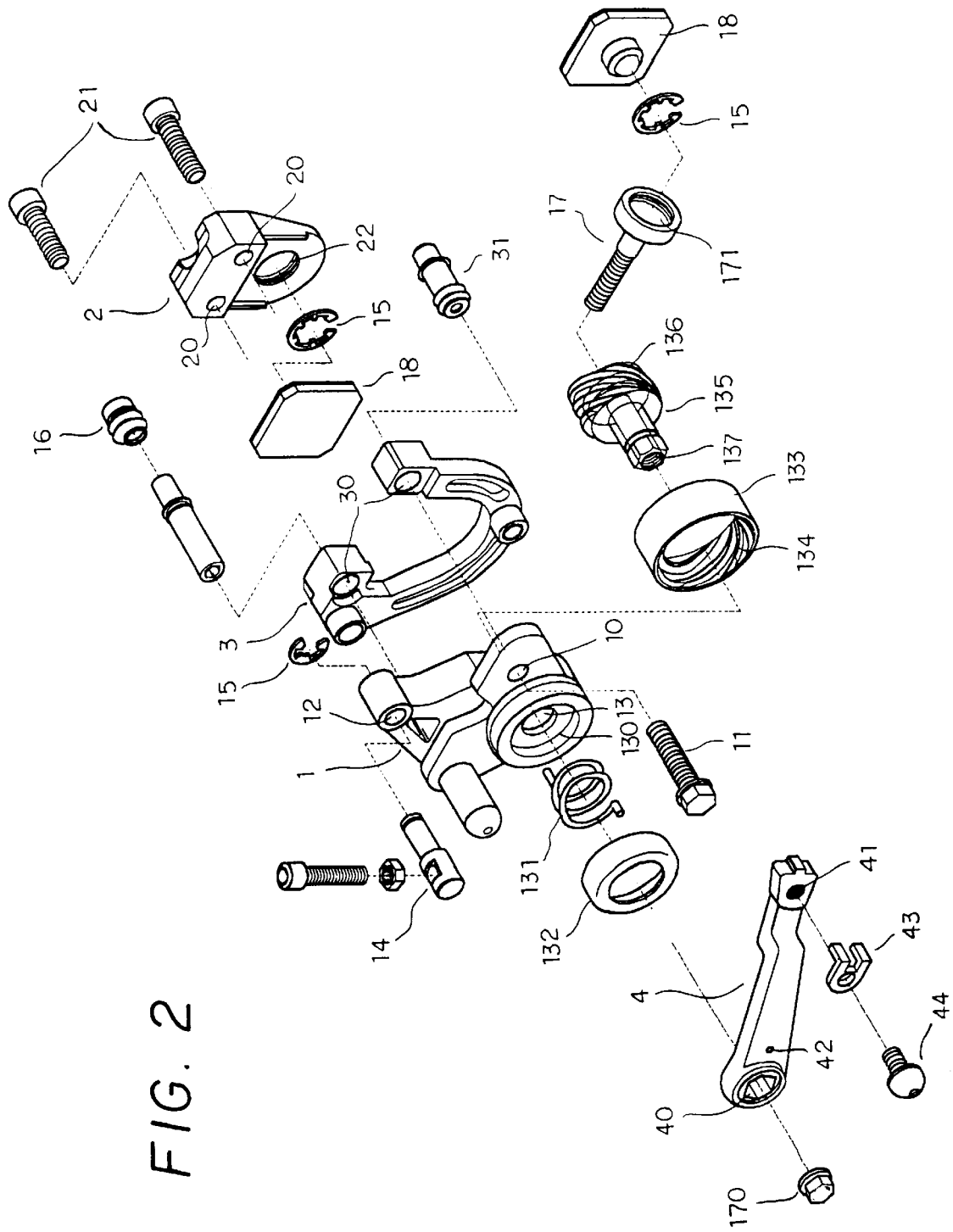
FIG. 2 is a perspective exploded view of the present invention.
Figure 3:
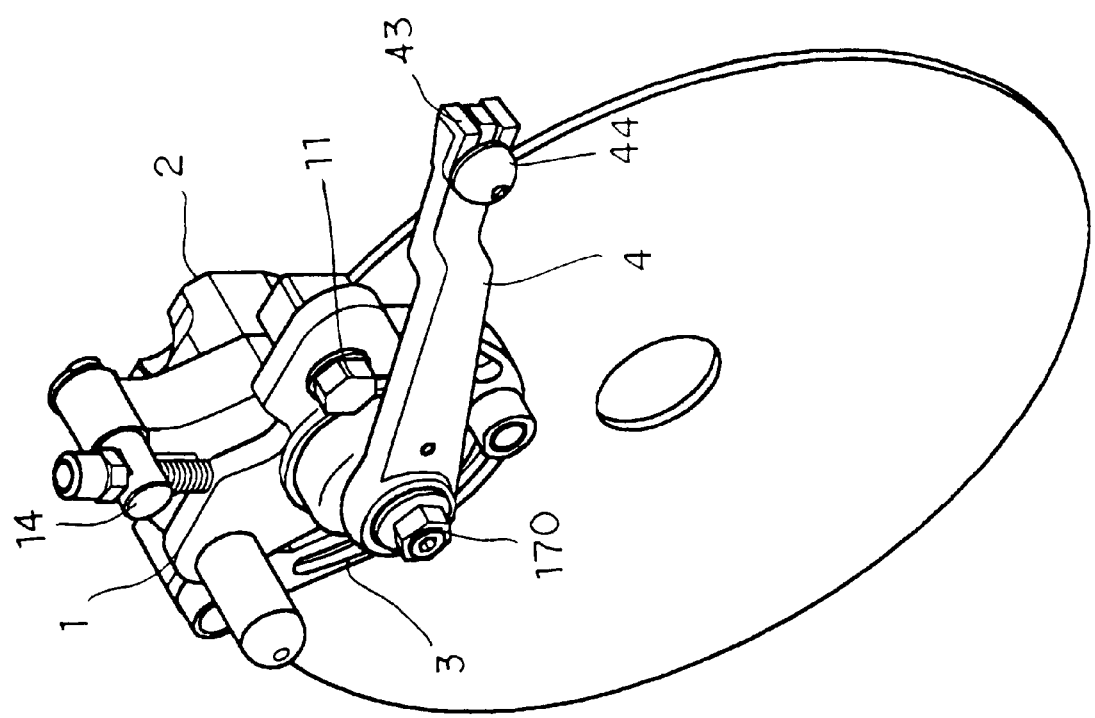
FIG. 3 is a perspective view showing that the present invention is associated with the brake disc.

Please refer to FIGS. 1 to 3. The mechanical disc brake of the present invention is mainly installed on a common bicycle. The mechanical disc brake is applicable to various types of bicycles, including an inner caliper 1, an outer caliper 2, a bracket 3 and a brake lever 4.

As shown in FIG. 2, a right side of the inner caliper 1 is formed with a through hole 10 for a fixing bolt 11 to pass therethrough. An upper and a lower sides of the inner caliper 1 are respectively formed with a cylindrical hole 12 and a circular hole 13. A pull cord fixing pin 14 is passed through the cylindrical hole 12. One end thereof is inserted with a C-shaped ring 15 and fitted with a guiding bolt collar 16. Two end faces of the circular hole 13 are respectively formed with larger circular dents 130 in one of which is disposed a restoring spring 131 and a dustproof cap 132 embracing the same. A fitting ring 133 is inserted in the other side circular dent 130. The inner wall face of the fitting ring is formed with recessed spiral threads 134. A transmission piston thread rod 135 formed with projecting spiral threads 136 is inserted in the fitting ring. The thread rod 135 is formed with a central thread hole 137 for an adjustment thread rod 17 to pass therethrough. The top end thereof is fitted with a tightening nut 170 and the bottom face thereof is formed with a sink 171 for a lining assembly 18 to insert therein, which is fixed by a C-shaped ring 15.

The outer caliper 2 is disposed with symmetrical circular holes 20. A locking bolt set 21 is passed therethrough to lock the outer caliper with the inner caliper 1. A through hole 22 is formed under the circular hole 20 corresponding to the circular dent 130. A lining assembly 18 is fixed by a C-shaped ring 15 in the through hole 22.

The bracket 3 is U-shaped. The free end of the bracket is formed with opposite connecting hole 30 for the guiding bolt 31 and the fixing bolt 11 to pass therethrough so as to connect the bracket 3 with the inner caliper 1.

One end of the brake lever 4 is formed with a socket 40, while the other end thereof is formed with an insertion hole 41. The socket 40 is connected with the transmission piston thread rod 135. An orifice is formed beside the socket 40 for one end of the restoring spring 131 to fit therein. The insertion hole 41 is pressed with a pull cord pressing board 43 and passed by a locking bolt 44 connected with a pull cord for controlling the brake.

Figure 4:
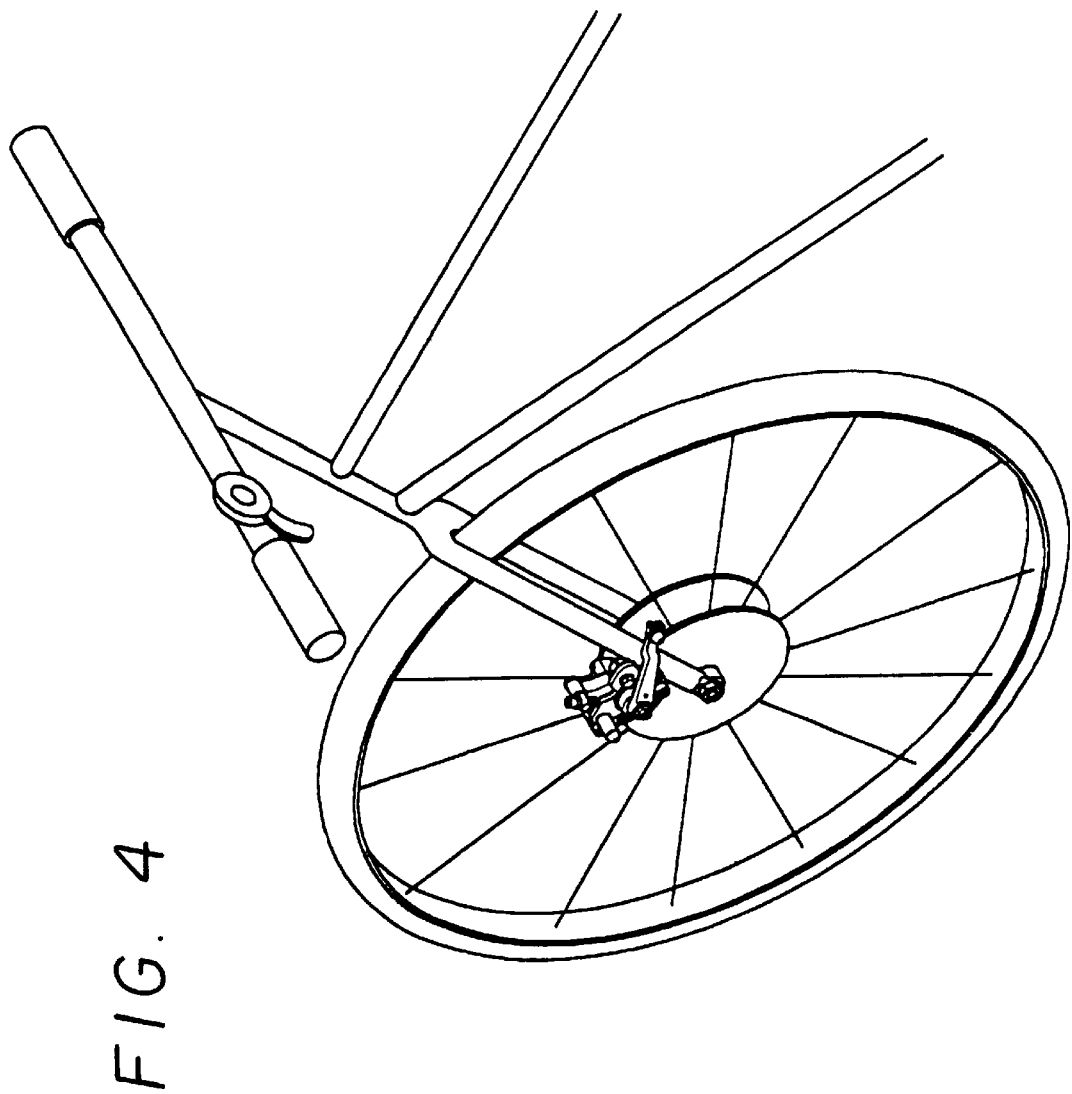
FIG. 4 shows that the present invention is installed on a bicycle.
Figure 5A:
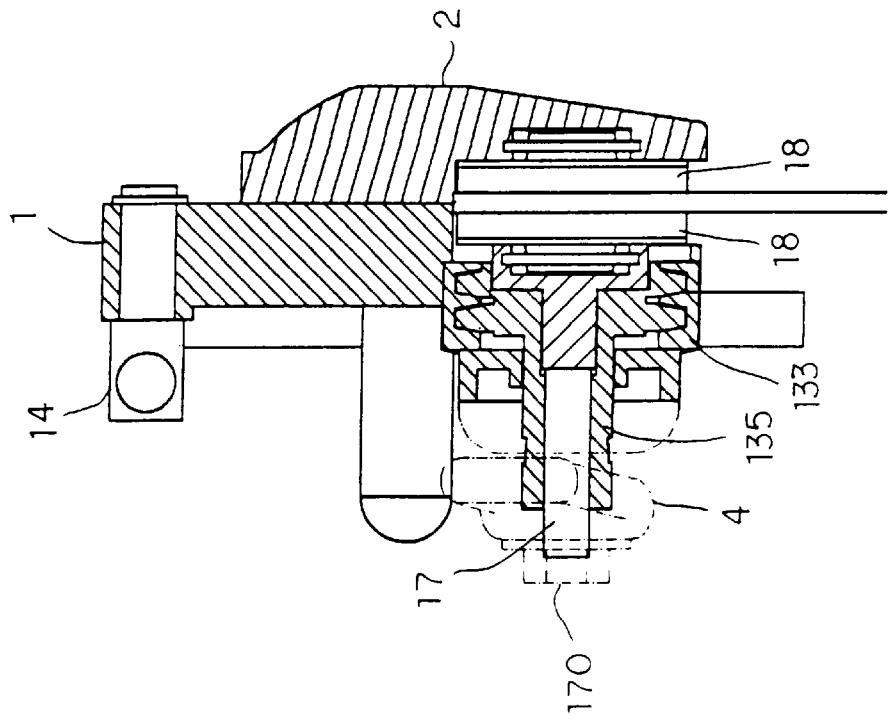
FIGS. 5A and 5B are is a sectional views showing the operation of the present invention.
Figure 5B:
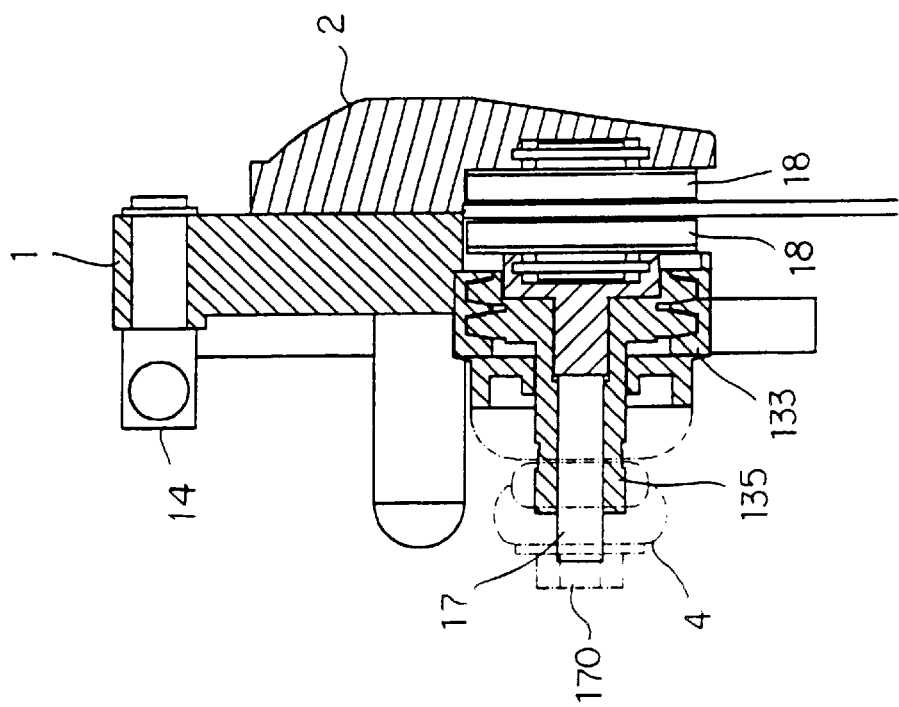

Referring to FIGS. 4 and 5, according to the above structure, in use, the disc brake is installed on a front wheel or a rear wheel of a bicycle. The pull cord is connected with the brake lever 4. When a rider decelerates or stops the bicycle, the pull cord is pulled to make the brake lever 4 drive the transmission piston thread rod 135 and forward push the adjustment thread rod 17. Accordingly, the lining assemblies 18 tightly clamp the brake disc to achieve a braking effect. After the brake is released, the calipers can slide on the bracket 3 to seek an optimal position so as to achieve a best gap between the lining assemblies 18 and the brake disc and minimize the frictional force.

According to the above arrangement, the adjustment bolt 17 and the sink 171 of the bottom thereof are integrally formed for the lining assembly 18 to insert therein to make the lining assembly 18 synchronously move. Therefore, during running of the bicycle, in the case of braking, the lining assemblies 18 will immediately tightly clamp the brake disc so as to decelerate or stop the wheel. When the brake is released, the lining assemblies 18 will be automatically restored to their home positions and kept spaced from the brake disc by a certain distance without frictional force which will affect the running of the bicycle. In addition, the lining assemblies 18 will be inevitably worn to a certain extent after a period of use. At this time, the tightening nut 170 is untightened and the adjustment bolt 17 is rotated to adjust the gap. The inner and outer calipers 1, 2 can slide parallel on the bracket 3, so that at the same time when the brake is released, the restoring force of the lining assemblies 18 will automatically seek an optimal position where the lining assemblies 18 are spaced from the brake disc by a best gap to minimize frictional force.

It is to be understood that the above description and drawings are only used for illustrating one embodiment of the present invention, not intended to limit the scope thereof. Any variation and derivation from the above description and drawings should be included in the scope of the present invention.

What is claimed is:

1. A mechanical disc brake comprising:

an inner caliper formed with circular hole and passed by pull cord fixing pin, two lateral faces of the circular hole being expanded to form circular dents, a transmission piston thread rod being disposed in one of the circular dents, a bottom face thereof being disposed with an adjustment thread rod and a lining assembly, a restoring spring being disposed in the other of the circular dents and connected with a brake lever;

an outer caliper formed with opposite circular holes and passed by a locking bolt, a through hole being formed under the circular holes and fixed with a lining assembly by a C-shaped ring;

a U-shaped bracket the free end of which is formed with connecting holes for the guiding bolt and fixing bolt to pass therethrough so as to connect with the inner caliper; and a brake lever, one end of the brake lever being formed with a socket, while the other end thereof being formed with an insertion hole, the socket being connected with the transmission piston thread rod, an orifice being formed beside the socket for one end of the restoring spring to fit therein, the insertion hole being pressed with a pull cord pressing board and passed by a locking bolt connected with a pull cord for controlling the brake, said disc brake being characterized in that:

the transmission piston thread rod is formed with a thread hole for the adjustment thread rod to screw therein, a top end of the adjustment thread rod being fitted with a tightening nut, a bottom end thereof being connected with a lining assembly by a C-shaped ring, whereby when the brake lever is free from driving force of the pull cord, the lining assemblies are kept spaced from the brake disc by an optimal gap.

2. A disc brake as claimed in claim 1, wherein a fitting ring is inserted in the circular dent, an inner wall face of the fitting ring being formed with recessed spiral threads, one end of the transmission piston thread rod being formed with projecting spiral threads corresponding to the recesses spriral stripes, whereby the recesses and projecting spiral stripes mesh with each other to make the transmission piston thread rod displaceable within the inner caliper.

3. A disc brake as claimed in claim 1, wherein the inner and outer calipers are associated with each other and slidable on the bracket, whereby after the brake is released, the calipers automatically seek an optimal position so as to achieve a best gap between the lining assemblies and the brake disc and minimize the frictional force.

* * * * *